United States Patent
Wu et al.

(10) Patent No.: US 10,807,487 B2
(45) Date of Patent: Oct. 20, 2020

(54) BATTERY MANAGEMENT AND BALANCE CIRCUIT, BATTERY SYSTEM AND METHOD OF CHARGING THE BATTERY SYSTEM

(71) Applicant: NATIONAL CHUNG SHAN INSTITUTE OF SCIENCE AND TECHNOLOGY, Taoyuan (TW)

(72) Inventors: Chi-Sheng Wu, Taoyuan (TW); Chih-Hsien Chung, Taoyuan (TW); Hsuang-Chang Chiang, Miaoli (TW); Tsang-Li Tai, Miaoli (TW)

(73) Assignee: NATIONAL CHUNG SHAN INSTITUTE OF SCIENCE AND TECHNOLOGY, Taoyuan (TW)

( * ) Notice: Subject to any disclaimer, the term of this patent is extended or adjusted under 35 U.S.C. 154(b) by 430 days.

(21) Appl. No.: 15/836,951

(22) Filed: Dec. 11, 2017

(65) Prior Publication Data

US 2019/0176636 A1 Jun. 13, 2019

(51) Int. Cl.
*B60L 58/22* (2019.01)
*B60L 53/30* (2019.01)
*H02J 7/00* (2006.01)

(52) U.S. Cl.
CPC .............. *B60L 53/30* (2019.02); *B60L 58/22* (2019.02); *H02J 7/0021* (2013.01); *H02J 7/0068* (2013.01)

(58) Field of Classification Search
CPC ........ B60L 53/30; B60L 58/22; H02J 7/0021; H02J 7/0068; H01M 10/425; H01M 10/486
USPC .................. 320/104, 118, 119, 134, 136, 163
See application file for complete search history.

(56) References Cited

U.S. PATENT DOCUMENTS

| 2012/0105001 | A1* | 5/2012 | Gallegos | B60L 3/0092 320/109 |
| 2016/0336623 | A1* | 11/2016 | Nayar | H02J 7/0068 |

\* cited by examiner

*Primary Examiner* — Edward Tso
*Assistant Examiner* — Aaron Piggush
(74) *Attorney, Agent, or Firm* — Schmeiser, Olsen & Watts, LLP

(57) ABSTRACT

A battery management and balance circuit comprises multiple battery group balance circuits, multiple battery module balance circuits and a battery management unit. The battery group balance circuits connect to battery groups for executing first charge or discharge command. The battery management unit connect to the battery group balance circuits and the battery module balance circuits for generating the first and second charge or discharge commands to the battery module balance circuits. A battery system and a battery management and balance circuit method is also introduced.

18 Claims, 6 Drawing Sheets

BATTERY MANAGEMENT AND BALANCE CIRCUIT, BATTERY SYSTEM AND METHOD OF CHARGING THE BATTERY SYSTEM

FIELD OF THE INVENTION

The present disclosure relates to a battery management and balance circuit implemented in a battery system and, more particularly, to a high efficiency battery management and balance circuit implemented in a battery system of a high voltage BEV (battery electric vehicle) power system.

BACKGROUND OF THE INVENTION

Referring to FIG. 1, FIG. 0.1 shows a conventional battery system 1000 which has a plurality of battery cells 1100. The plurality of battery cells 1100 are identical to each other and have the same nominal voltage, for example, 3.7V or 4.2V per cell.

In FIG. 1, four battery cells 1100 arrange in series to become a battery module (or battery pack) 1200, forty battery modules 1200 arrange in series to become a battery unit 1300. The battery units 1300 have an output end 1310 and an input end 1320, wherein the output end 1310 is connected and uninterruptedly supplying power to load(s) and the input end 1320 is used to be charged. The numbers of the battery cells 1100, battery modules 1200, and battery unit 1300, depending on desire output voltage and/or other design consideration, can be different from this case in other conventional battery systems.

The conventional battery system 1000 can be applied to a battery electric vehicle, for example, an electric bus. The output end 1310 of conventional battery system 1000 can connect to electric bus motor(s) for power supply. While the conventional battery system 1000 of the electric bus is charging, a battery module 1200 connected near the input end 1320 may be over charged while a battery module 1200 connected far from the input end 1320 may not be charged.

After few cycles of the conventional battery system charging and discharging process, some battery cells 1100 (or battery modules 1200) of conventional battery system 1000 may be overcharged while some others battery cells 1100 (or battery modules 1200) of conventional battery system 1000 may be over discharged. This unbalanced state may cause great and irreversible damages to conventional battery system 1000, for example, significantly capacity and life time reduction.

Accordingly, it is imperative to provide a high efficiency battery management and balance circuit which can implement in a high voltage BEV (battery electric vehicle) power system and overcomes the aforesaid drawbacks of the conventional battery system 1000.

SUMMARY OF THE INVENTION

In view of the aforesaid drawbacks of the prior art, it is an objective of the present disclosure to provide a battery management and balance circuit, a battery system and method of charging the battery system which can implement in a high voltage BEV (battery electric vehicle) power system, features a high efficiency management and balance strategy and achieves high speed voltage balance ability.

In order to achieve the above and other objectives, the present disclosure provides a battery management and balance circuit implemented in a battery system. The battery system has L battery groups connected and arranged in parallel. Each of battery groups has M battery modules connected and arranged in series.

The battery management and balance circuit comprises L battery group balance circuits, L×M battery module balance circuits and a battery management unit.

Each of the L battery group balance circuits connects to a battery group of the L battery groups for executing a first charge or discharge command to the connected battery group. Each of the L×M battery module balance circuits connects to a battery group balance circuit of the L battery group balance circuits and a battery module of the L×M battery modules for executing a second charge or discharge command to the connected battery module.

The battery management unit connects to the L battery group balance circuits, respectively, for directly or indirectly generating the first charge or discharge commands to the L battery group balance circuits, respectively, and for directly or indirectly generating the second charge or discharge commands to the M battery module balance circuits corresponding to the battery group to be charged or discharged.

Regarding the battery management and balance circuit, each of the L×M battery modules having N battery cells connected and arranged in series and the battery management and balance circuit further comprises L×M×N battery cell balance circuits and L×M battery cell monitor units, each of the L×M×N battery cell balance circuits connecting to a battery cell of the L×M×N battery cells for executing a third charge or discharge command to the connected battery cell, each of the L×M battery cell monitor units monitoring N battery cells in the same module for generating battery cell information and corresponding to the N battery cell balance circuits connected to the N battery cells, respectively, for generating the third charge or discharge commands according to battery cell information to the corresponding battery cell balance circuits.

Regarding the battery management and balance circuit, the battery management unit connects to L×M battery cell monitor units for receiving the battery cell information and directly or indirectly generates the first and second charge or discharge commands according to the battery cell information.

Regarding the battery management and balance circuit, the battery management unit directly or indirectly generates the first charge command to one battery group balance circuit with a lowest monitored voltage among the L corresponding battery group balance circuits and the first discharge command to another battery group balance circuit with a highest monitored voltage among the L corresponding battery group balance circuits.

Regarding the battery management and balance circuit, the battery management unit directly or indirectly generates the second charge command to one battery module balance circuit with a lowest monitored voltage among the M corresponding battery module balance circuits and the second discharge command to another battery module balance circuit with a highest monitored voltage among the M corresponding battery module balance circuits.

Regarding the battery management and balance circuit, each of the battery cell monitor units generates the third charge command to one battery cell balance circuit with a lowest monitored voltage among the N corresponding battery cell balance circuits and the first discharge command to another battery cell balance circuit with a highest monitored voltage among the N corresponding battery cell balance circuits.

Regarding the battery management and balance circuit, the L battery group balance circuits are implemented in a charging station, the L×M battery module balance circuits are implemented in a battery electric vehicle and the battery management unit is also implemented in the battery electric vehicle.

In order to achieve the above and other objectives, the present disclosure provides a battery system. The battery system comprises L battery groups, L×M battery modules, L battery group balance circuits, L×M battery module balance circuits and a battery management unit.

Each of the L battery groups has M battery modules connected and arranged in parallel. Each of the L battery group balance circuits connects to a battery group of the L battery groups for executing a first charge or discharge command to the connected battery group. Each of the L×M battery module balance circuits connects to a battery group balance circuit of the L battery group balance circuits and a battery module of the L×M battery modules for executing a second charge or discharge command to the connected battery module.

The battery management unit connects to the L battery group balance circuits, respectively, for directly or indirectly generating the first charge or discharge commands to the L battery group balance circuits, respectively, and for directly or indirectly generating the second charge or discharge commands to the M battery module balance circuits corresponding to the battery group to be charged or discharged.

Regarding the battery system, each of the L×M battery modules having N battery cells connected and arranged in series and the battery management and balance circuit further comprises L×M×N battery cell balance circuits and L×M battery cell monitor units, each of the L×M×N battery cell balance circuits connecting to a battery cell of the L×M×N battery cells for executing a third charge or discharge command to the connected battery cell, each of the L×M battery cell monitor units monitoring N battery cells in the same module for generating battery cell information and corresponding to the N battery cell balance circuits connected to the N battery cells, respectively, for generating the third charge or discharge commands according to battery cell information to the corresponding battery cell balance circuits.

Regarding the battery system, the battery management unit connects to L×M battery cell monitor units for receiving the battery cell information and directly or indirectly generates the first and second charge or discharge commands according to the battery cell information.

Regarding the battery system, the battery management unit directly or indirectly generates the first charge command to one battery group balance circuit with a lowest monitored voltage among the L corresponding battery group balance circuits and the first discharge command to another battery group balance circuit with a highest monitored voltage among the L corresponding battery group balance circuits.

Regarding the battery system, the battery management unit directly or indirectly generates the second charge command to one battery module balance circuit with a lowest monitored voltage among the M corresponding battery module balance circuits and the second discharge command to another battery module balance circuit with a highest monitored voltage among the M corresponding battery module balance circuits.

Regarding the battery system, each of the battery cell monitor units generates the third charge command to one battery cell balance circuit with a lowest monitored voltage among the N corresponding battery cell balance circuits and the first discharge command to another battery cell balance circuit with a highest monitored voltage among the N corresponding battery cell balance circuits.

Regarding the battery system, the L battery group balance circuits are implemented in a charging station, the L×M battery module balance circuits are implemented in a battery electric vehicle and the battery management unit is also implemented in the battery electric vehicle.

In order to achieve the above and other objectives, the present disclosure provides a battery cell management and balance method of charging a battery system. The battery system has L battery groups connected and arranged in parallel. Each of the battery groups has M battery modules connected and arranged in series.

The battery management and balance method comprises (a) connecting a charge device to each of the L battery groups of the battery system; (b) balancing the power between the L battery groups in the charging process of the battery system, and (c) balancing the power between the M battery modules in a battery group of the L battery groups in the charging process of the battery system.

Regarding the battery management and balance method, step (b) comprises (b1) generating a first charge or discharge command and (b2) executing the first charge or discharge command to a battery group of L battery groups.

Regarding the battery management and balance method, step (c) comprises (c1) generating a second charge or discharge command and (c2) executing the second charge or discharge command to a battery module of the M battery modules in the battery group.

Regarding the battery cell management and balance method, each of the L×M battery modules having N battery cells connected and arranged in series and the battery management and balance method further comprises (d) monitoring L×M×N battery cells for generating battery cell information, (e) generating a third charge and discharge command according to the battery cell information and (f) executing the third charge and discharge command to a battery cell of the N battery cells in a battery module and thus balancing the power between the N battery cells in the battery module in the charging process of the battery system.

Regarding the battery cell management and balance method, step (d) is performed before step (b) and step (c); in step (b1), the generation of the first charge or discharge command is according to the battery cell information; in step (c1), the generation of the second charge or discharge command is according to the battery cell information, and step (b), step (c) and step (f) are performed at the same time.

Regarding the battery cell management and balance method, in step (b2), the first charge command is executed to charge one battery group with a lowest monitored voltage among the L battery groups and the first discharge command is executed to discharge another battery group with a highest monitored voltage among the L battery groups.

Regarding the battery cell management and balance method, in step (c2), the second charge command is executed to charge one battery module with a lowest monitored voltage among the M battery modules in a battery group and the second discharge command is executed to discharge another battery module with a highest monitored voltage among the M battery modules in the battery group.

Regarding the battery cell management and balance method, wherein, in step (f), the third charge command is executed to charge one battery cell with a lowest monitored voltage among the N battery cells in the battery module and the third discharge command is executed to discharge another battery cell with a highest monitored voltage among the N battery cells in the battery module.

In conclusion, give the aforesaid circuit, battery system and method of charging the battery system, the present disclosure can (but not limit to) be implemented in a high voltage BEV (battery electric vehicle) power system, features a high efficiency management and balance strategy and achieves high speed voltage balance ability.

BRIEF DESCRIPTION OF THE DRAWINGS

Objectives, features, and advantages of the present disclosure are hereunder illustrated with specific embodiments in conjunction with the accompanying drawings.

DETAILED DESCRIPTION OF THE PREFERRED EMBODIMENTS

Figure 1:
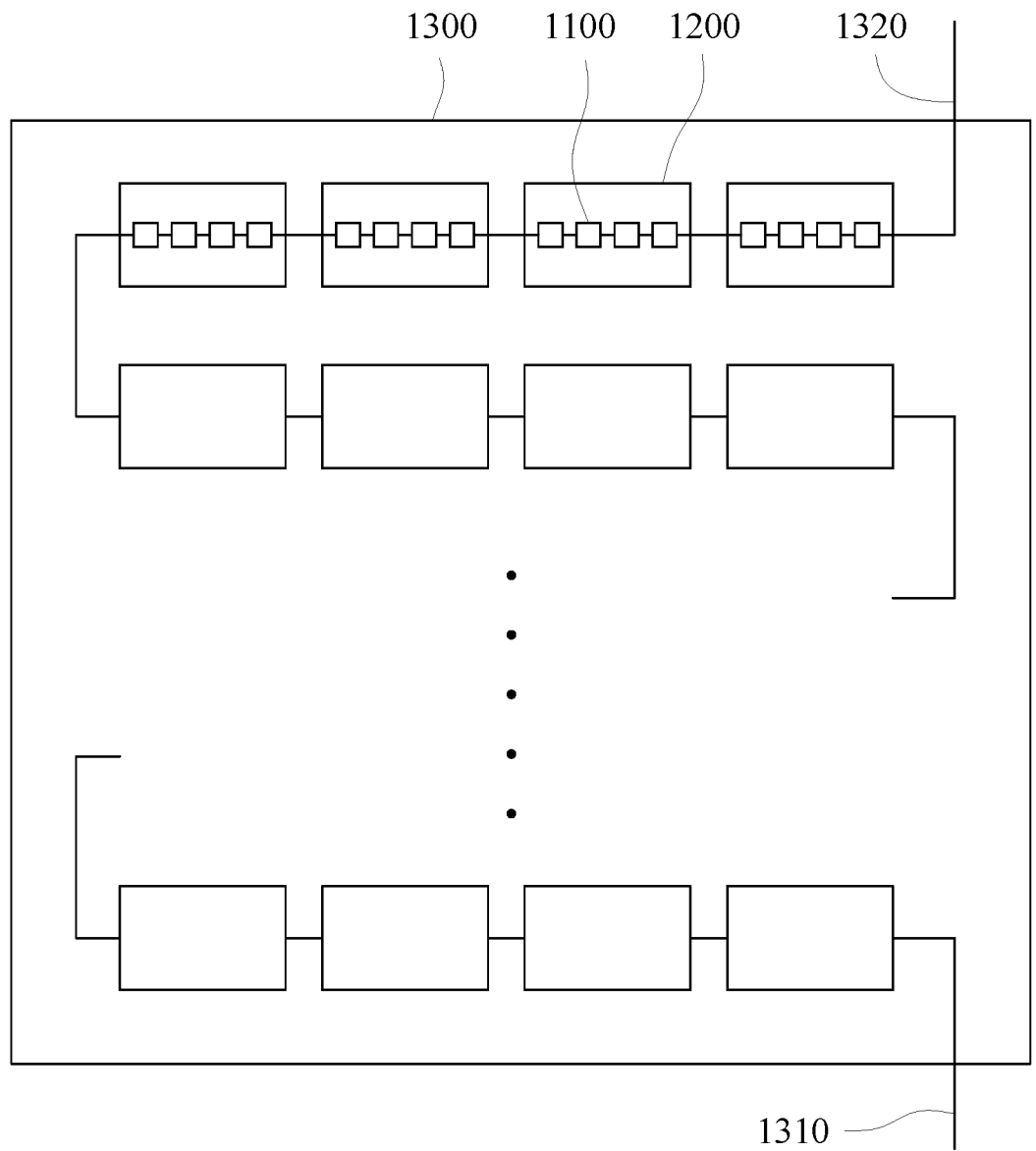
FIG. 1 shows a schematic diagram of a conventional battery system.
Figure 2:
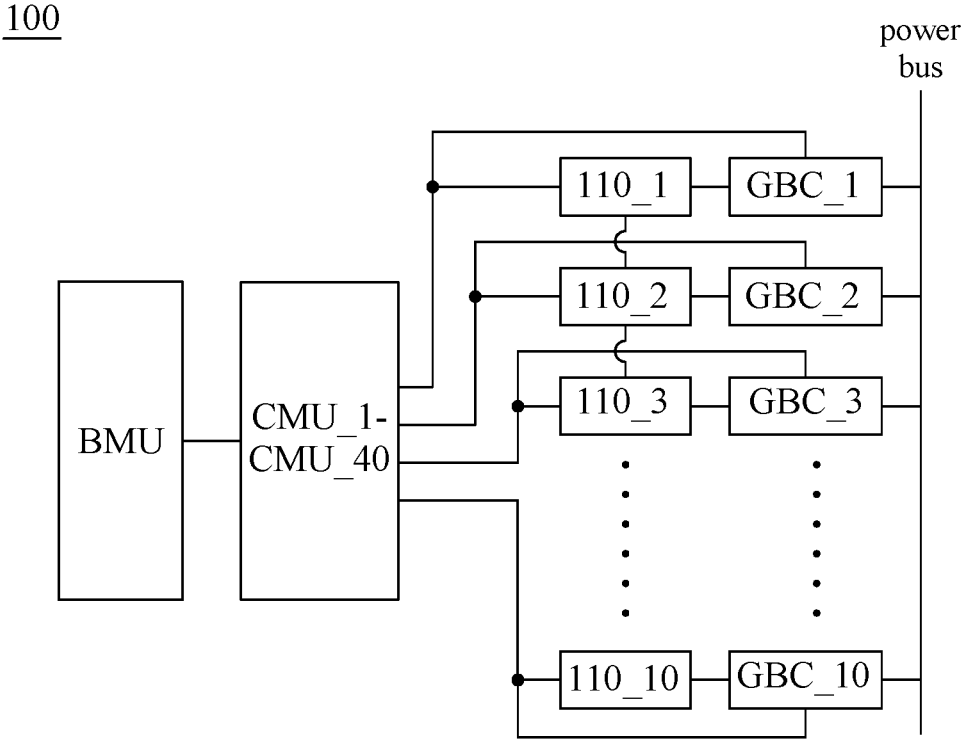
FIG. 2 is a schematic diagram of a battery management and balance circuit of a battery system implemented in a battery system according to an embodiment of the present disclosure.
Figure 3:
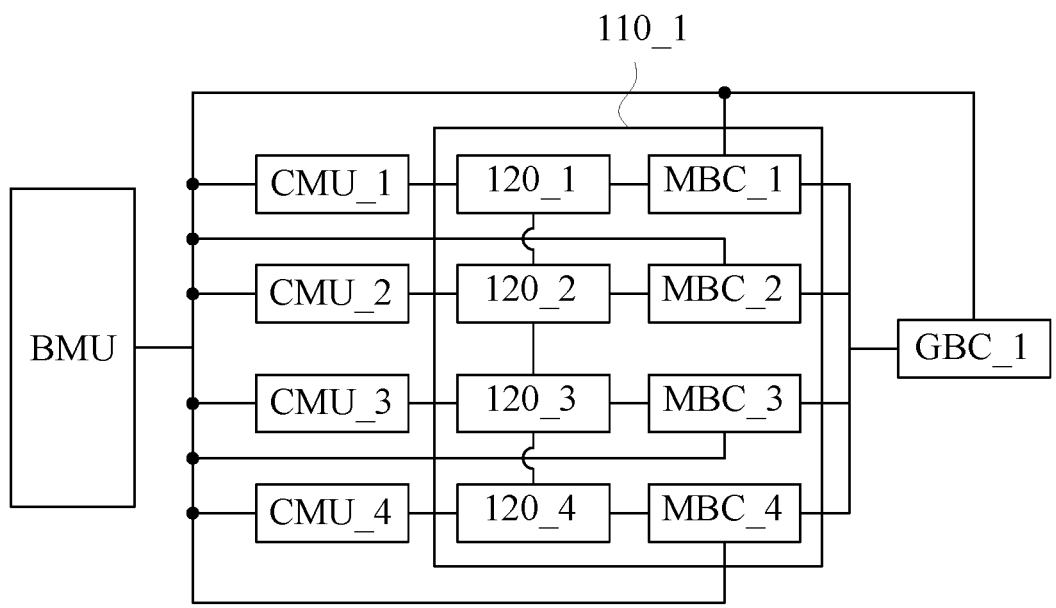
FIG. 3 is a schematic diagram of a battery management and balance circuit of a battery system implemented in a battery group of the battery system according to an embodiment of the present disclosure.
Figure 4:
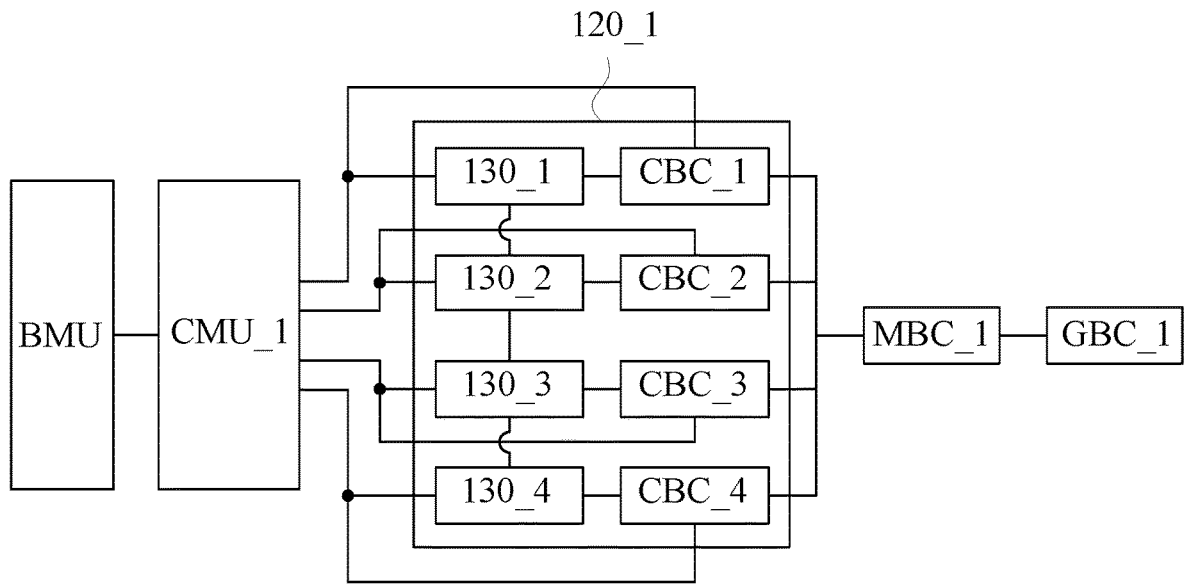
FIG. 4 is a schematic diagram of a battery management and balance circuit of a battery system implemented in a battery module of the battery system according to an embodiment of the present disclosure.

FIG. 2 is a schematic diagram of a battery management and balance circuit of a battery system implemented in a battery system according to an embodiment of the present disclosure. FIG. 3 is a schematic diagram of a battery management and balance circuit of a battery system implemented in a battery group of the battery system according to the embodiment of the present disclosure. FIG. 4 is a schematic diagram of a battery management and balance circuit of a battery system implemented in a battery module of the battery system according to the embodiment of the present disclosure.

Referring to FIG. 2, the battery system 100 has ten (L is ten in this embodiment but can be other numbers in other possible embodiment) battery groups 110_1-110_10 and ten corresponding battery group balance circuits GBC_1-GBC_10, wherein all of the battery group balance circuits GBC_1-GBC_10 connect to a power bus of the battery system 100. The power bus of the battery system 100 can directly/indirectly connect to an output end of an external charging device. The battery group balance circuits GBC_1-GBC_10 arrange in parallel and each of them connects to corresponding one battery group for executing a first charge command or a first discharge command to the connected battery group.

Referring to FIG. 3, a battery group 110_1 of FIG. 2 of the battery group 110_1-110_10 has four (M is four in this embodiment but can be other numbers in other possible embodiment) battery modules 120_1-120_4 and four corresponding battery module balance circuits MBC_1-MBC_4, wherein the battery modules 120_1-120_4 connected and arranged in series. Each of the battery module balance circuits MBC_1-MBC_4 connects to a battery module of the four battery modules 120_1-120_4 for executing a second charge or discharge command to the connected battery module. In this embodiment, given that four battery module balance circuits connect to one battery group balance circuit, the battery system 100 has forty battery modules 120_1-120_40 and forty corresponding battery module balance circuits MBC_1-MBC_40, wherein the battery modules 120_5-120_40 and the battery module balance circuits MBC_5-MBC_40 do not show in FIG. 3 or other figures for the object of convenience.

Referring to FIG. 4, a battery module 120_1 of FIG. 3 of the battery module 120_1-120_4 has four (N is four in this embodiment but can be other numbers in other possible embodiment) battery cells 130_1-130_4 and four battery cell balance circuits CBC_1-CBC_4, wherein the battery cells 130_1-130_4 connected and arranged in series. Each of the battery cell balance circuits CBC_1-CBC_4 connects to a battery cell of the four battery cells 130_1-130_4 for executing a third charge command or a third discharge command to the connected battery cell. In this embodiment, given that four battery cell balance circuits connect to one battery module balance circuit, the battery system 100 has 160 battery cells 130_1-130_160 and 160 corresponding battery cell balance circuits CBC_1-CBC_160, wherein the battery cells 130_5-130_160 and the battery cell balance circuits CBC_5-CBC_160 do not show in FIG. 4 or other figures for the object of convenience.

In this embodiment, there is 4S4P battery pack in a battery module with 59.7V (3.7V*16=59.7V) battery module nominal output voltage. In other embodiment, battery module nominal output voltage of 4S4P battery pack can be changed. For example, battery module nominal output voltage can be changed to 67.2V (4.2V*16=67.2V) using 4S4P 4.2V battery cell connected and arranged in series.

Referring back to FIG. 2, FIG. 3 and FIG. 4, the battery system 100 has a battery management unit BMU and forty (L×M) battery cell monitor units CMU_1-CMU_40. The battery management unit BMU connects to each of battery cell monitor units CMU_1-CMU_40. The battery management unit BMU also connects to each of battery group balance circuits GBC_1-GBC_10 and battery module balance circuits MBC_1-MBC_40. Each of the battery cell monitor units CMU_1-CMU_40 connects to four battery cells. The connection between the battery cell monitor unit CMU_1 and the battery cells 130_1-130_4 shows in FIG. 4, while the connections between the battery cell monitor units CMU_2-CMU_40 and the battery cells 130_5-130_160 do not show in FIG. 4 or other figures for the object of convenience.

The battery cell monitor units CMU_1-CMU_40 monitors the battery cells 130_1-130_160 and generates battery cell information according to monitor results. For example, the battery cell monitor unit CMU_1 monitors the battery cells 120_1-120_4 and generates the battery cell information according to monitor results. The battery cell information can include battery cell voltages, battery cell temperatures, and so on.

The battery management unit BMU receives the battery cell information from each battery cell monitor units CMU_1-CMU_40. The battery management unit BMU can compute states of charge (SOC), charge and discharge voltages, charge and discharge currents for battery cells, battery modules, and battery groups according to the battery cell information. Also, the battery management unit BMU can perform temperature protection according to the battery cell monitor temperature of the battery cell information.

The battery management unit BMU can generate the first charge command and/or the first discharge command according to the battery cell information to the battery group balance circuits GBC_1-GBC_10.

Also, the battery management unit BMU can generate the second charge command and/or the second discharge command in a battery group according to the battery cell information of the battery group. The battery management unit BMU transmits the second charge command and/or the second discharge command to the battery module balance circuits MBC_1-MBC_4 (or MBC_5-MBC_8, MBC_9-MBC_12, . . . , MBC_37-MBC_40).

For example, in a battery group, if the monitored voltages of battery cells 130_1-130_16 are 2.0V, 2.0V, 2.0V, 2.0V, 2.1V, 2.1V, 2.1V, 2.1V, 2.2V, 2.2V, 2.2V, 2.2V, 2.3V, 2.3V, 2.3V, 2.3V, respectively, then the monitored voltages of the battery modules 120_1-120_4 are 8.0V, 8.4V, 8.8V, 9.2V, respectively. In this case, the battery module 120_1 has the lowest monitored voltage (8.0V) among the battery modules 120_1-120_4 and the battery module 120_4 has the highest monitored voltage (9.2V) among the battery modules 120_1-120_4. The battery management unit BMU generates the second charge command to the battery module 110_1 and the second discharge command to battery module 110_4 for voltage balance.

Also, in this case, the battery module balance circuit MBC_1 executes the second charge command for charging the battery module 120_1 and the battery module balance circuit MBC_4 executes the second discharge command for discharging the battery module 120_4. The second charge command and the second discharge command can be executed at the same time. The charge amount of the battery module 120_1 can be substantially equal to the discharge amount of the battery module 120_4.

For another example, if the monitored voltages of battery modules 120_1-120_40 are 8.0V, 8.0V, 8.0V, 8.0V, 9.0V, 9.0V, 9.0V, 9.0V, . . . , 9.0V, 9.0V, 9.0V, 9.0V, 10.0V, 10.0V, 10.0V, 10.0V respectively, then the monitored voltages of the battery groups 110_1-110_10 are 32.0V, 36.0V, . . . , 36.0V, 40.0V, respectively. In this case, the battery group 110_1 has the lowest monitored voltage (32.0V) among the battery groups 110_1-110_10 and the battery group 110_10 has the highest monitored voltage (40.0V) among the battery groups 110_1-110_10. The battery management unit BMU generates the first charge command to the battery group 110_1 and the first discharge command to battery group 110_10 for voltage balance.

Also, in this case, the battery group balance circuit GBC_1 executes the first charge command for charging the battery group 110_1 and the battery group balance circuit GBC_10 executes the first discharge command for discharging the battery group 110_10. The first charge command and the first discharge command can be executed at the same time. The charge amount of the battery group 110_1 can be equal to the discharge amount of the battery group 110_10.

In other embodiments, the battery management unit BMU can only generate the first charge command or only generate the first discharge command to one (or more) battery group balance circuit. Also, in other embodiments, the battery management unit BMU can only generate the second charge command or only generate the second discharge command to one (or more) battery module balance circuit in a battery module.

The battery management unit BMU can generate the first charge command, the first discharge command, the second charge command or the second discharge command not merely according to the battery cell information. For example, the battery management unit BMU can generate the first charge command, the first discharge command, the second charge command or the second discharge command according to sensing signals of sensing members which directly senses the output voltage of the battery modules or the battery groups. In this example, the generation of the first charge command, the first discharge command, the second charge command or the second discharge command are not generated according to the SOC of the battery cells, such that the battery cell information is not required.

The battery cell monitor units CMU_1-CMU_40 generate the third charge command and/or the third discharge command in a battery module according to the battery cell information of the battery module. Each of the battery cell monitor units CMU_1-CMU_40 transmits the third charge command and/or the third discharge command to the connected battery cell balance circuit.

For example, if the monitored voltages of battery cells 130_1-130_4 are 2.0V, 2.1V, 2.2V, 2.3V, respectively, the battery cell monitor unit CMU_1 generates the third charge command according to the battery cell information to the battery cell balance circuit CBC_1 and the third discharge command according to the battery cell information to the battery cell balance circuit CBC_4. The battery cell balance circuit CBC_1 executes the third charge command for charging the battery cell 130_1 and the battery cell balance circuit MBC_4 executes the third discharge command for discharging the battery cell 130_4. The third charge command and the third discharge command can be executed at the same time. The charge amount of the battery cell 130_1 can be substantially equal to the discharge amount of the battery cell 130_4. In other embodiments, the battery cell monitor unit CMU_1 can only generate the third charge command or only generate the third discharge command to one (or more) battery cell balance circuit.

Persons skilled in the art understand that the battery management unit BMU can connect to the battery module balance circuits MBC_1-MBC_40 and the battery group balance circuits GBC_1-GBC_10 in many ways, for instance, directly/indirectly wire/wireless connection, for the purpose of the transmission of the first and second charge and discharge commands.

Persons skilled in the art also understand that the battery cell monitor units CMU_1-CMU_160 can connect to the battery cell balance circuits CBC_1-CBC_160 in many ways, for instance, directly/indirectly wire/wireless connection, for the purpose of the transmission of the third charge and discharge commands.

Viewed in a certain aspect, the battery cell monitor unit CMU_1-CMU_40 and the battery cell balance circuits CBC_1-CBC_160 belong to a third level balance layer. The battery module balance circuits MBC_1-MBC_40 belong to a second level balance layer. The battery group balance circuits GBC_1-GBC_10 belong to a first level balance layer. The battery cell management belongs to both of the first and second level balance layer. Therefore, the battery management and balance circuit of present disclosure becomes a hierarchical management and balance circuit. The battery cell monitor units CMU_1-CMU_4 are third level management components and the battery management unit BMU is a first and second level management component. The battery cell balance circuits CBC_1-CBC_160 are third level balance circuits, the battery module balance circuits MBC_1-MBC_40 are second level balance circuits and the battery group balance circuits GBC_1-GBC_10 are first level balance circuits.

The first charge and discharge commands are generated and executed in first level voltage balance control. The second charge and discharge commands are generated and executed in second level voltage balance control. The third charge and discharge commands are generated and executed in third level voltage balance control.

In other one embodiment, the hierarchical management and balance circuit can have more levels of balances. Also, there is possible that the level numbers of hierarchical management components equal to the level numbers of hierarchical balance circuits. For example, there is possible that a hierarchical structure has four levels of hierarchical management components and four levels of hierarchical balance circuits.

The numbers of the first charge commands and the first discharge commands can be 2 (or more), respectively, and the numbers of the first charge commands and the first discharge commands can be different. For example, the battery management unit BMU can generate three first charge command to battery group balance circuits GBC_4-GBC_6, respectively, and two first discharge command to battery group balance circuits GBC_7-GBC_8, respectively to balance the output voltages of ten groups in the battery system 100.

The numbers of the second charge command and the second discharge command can be 2 (or more), respectively, and the numbers of the second charge commands and the second discharge commands can be different. For example, in the battery group 110_1, the battery management unit BMU can generate two first charge commands to battery module balance circuits MBC_1-MBC_2, respectively, and two first discharge commands to battery module balance circuits MBC_3-MBC_4, respectively to balance the output voltages of four modules in the battery group 110_1.

The numbers of the third charge commands and the third discharge commands can be 2 (or more), respectively, and the numbers of the third charge commands and the third discharge commands can be different. For example, in the battery module 120_2, the battery cell monitor unit CMU_2 can generate two third charge commands to battery cell balance circuits CBC_5-CBC_6, respectively, and two first discharge command to battery cell balance circuits CBC_7-CBC_8, respectively to balance the output voltages of four cells in the battery module 120_2.

Figure 5:
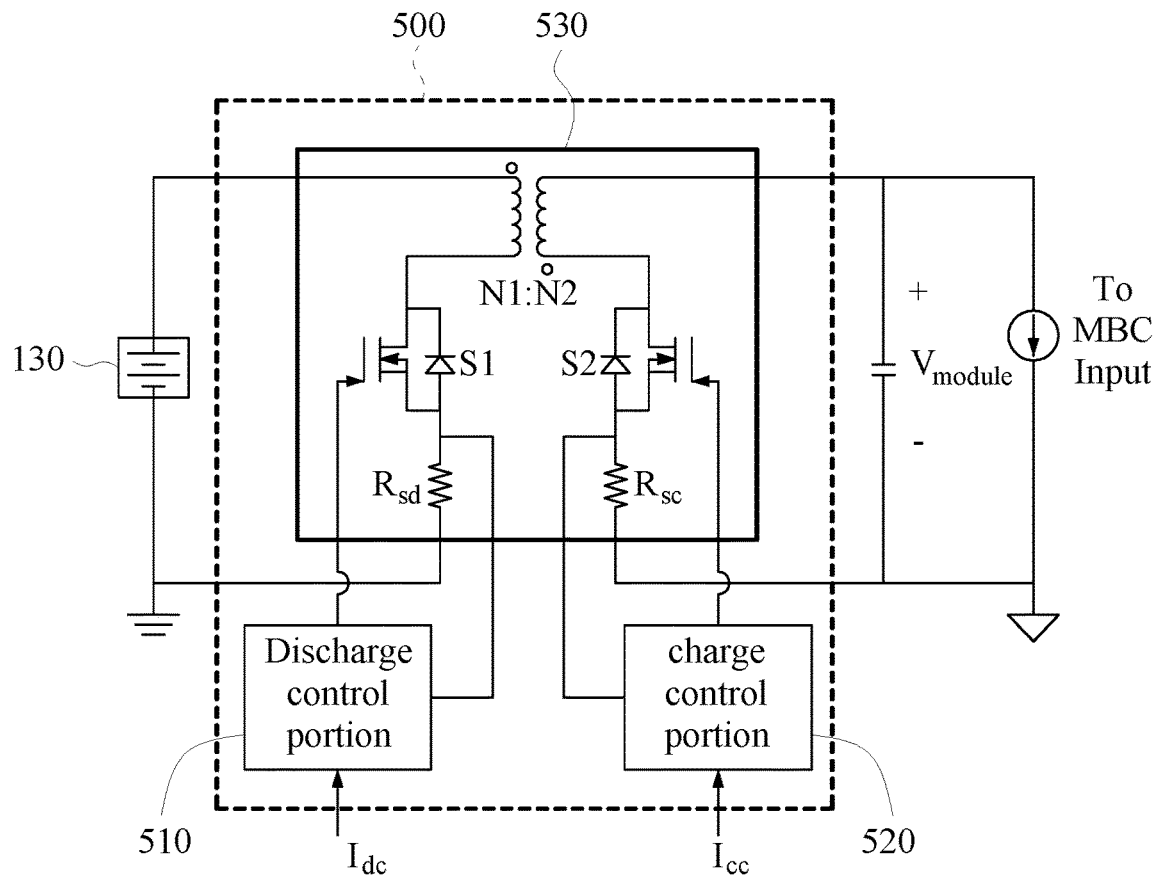
FIG. 5 is a schematic diagram of a battery cell balance circuit according to an embodiment of the present disclosure.

Referring to FIG. 5, FIG. 5 is a schematic diagram of a battery cell balance circuit according to an embodiment of the present disclosure. The battery cell balance circuit 500 which has two sides respectively connected to the battery cell 130 and the voltage of the battery module balance circuits MBC (or input or output ends of MBC) has a discharge control portion 510, a charge control portion 520 and a fly-back converter 530. The fly-back converter 530 includes a first order side switch S1, a second order side switch S2, a first resistance $R_{sd}$, a second resistance $R_{sc}$ and a coil.

The discharge control portion 510 can receive the third discharge command $I_{dc}$ from the connected battery cell monitor unit CMU in a peak current control mode. The battery cell balance circuit CBC executes the third discharge command $I_{dc}$ and turns on the first order side switch S1, while the second order side switch S2 is still in a cutoff state.

The charge control portion 420 can receive the first charge command $I_{cc}$ from the connected battery cell monitor unit CMU in the peak current control mode. The battery cell balance circuit CBC executes the third charge command $I_{cc}$ and turns on the second order side switch S2, while the first order side switch S1 is still in a cutoff state.

Figure 6:
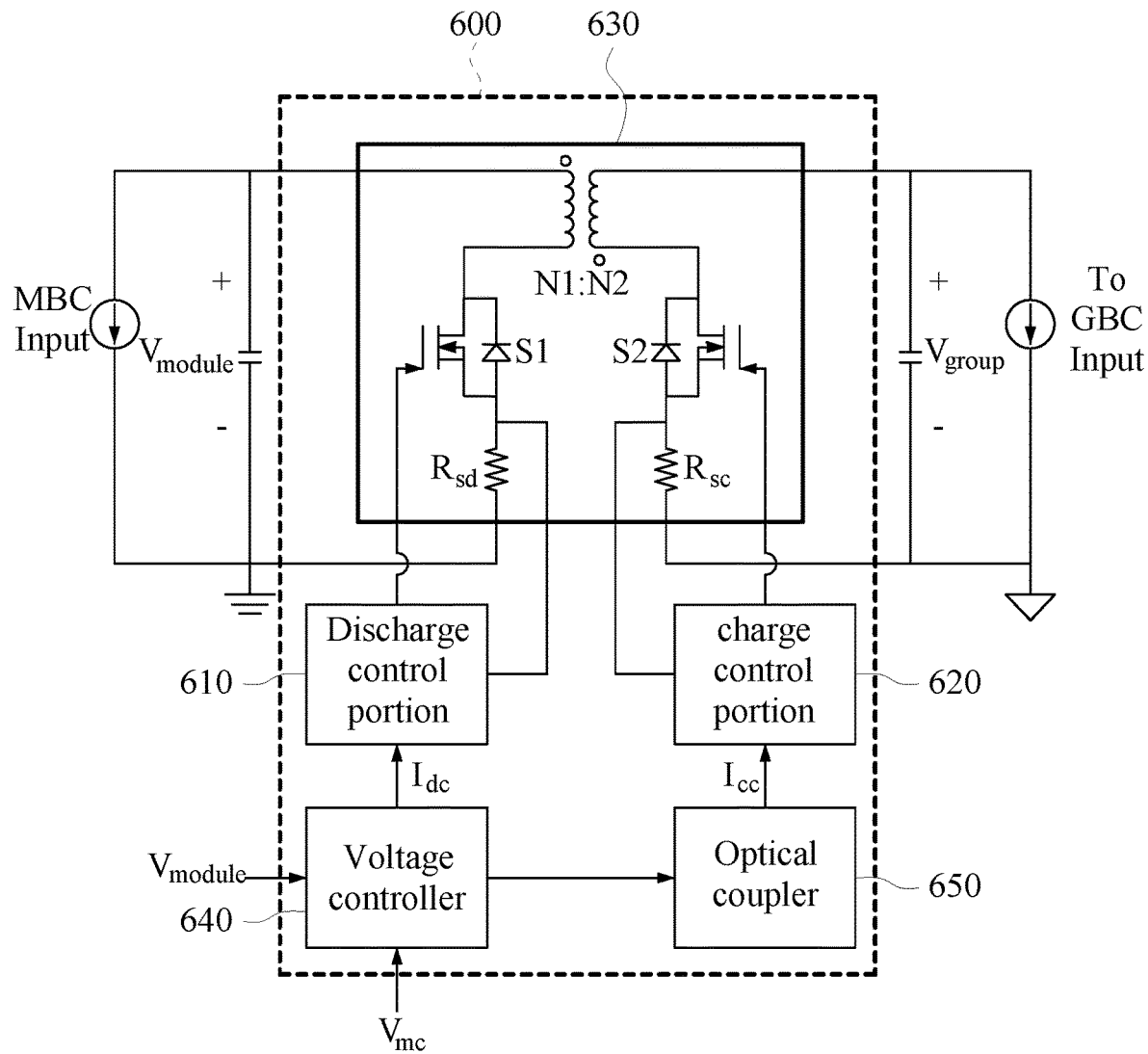
FIG. 6 is a schematic diagram of a battery module balance circuit according to an embodiment of the present disclosure.

Referring to FIG. 6, FIG. 6 is a schematic diagram of a battery module balance circuit according to an embodiment of the present disclosure. In FIG. 6, two sides of the battery module balance circuit 600 are respectively connected to the voltage of the battery module balance circuit MBC (or input or output ends of MBC) and the voltage of the battery group balance circuit GBC (or input or output ends of GBC). The battery module balance circuit 600 has a discharge control portion 610, a charge control portion 620, a fly-back converter 630, a voltage controller 640 and an optical coupler 650. The fly-back converter 630 includes a first order side switch S1, a second order side switch S2, a first resistance $R_{sd}$, a second resistance $R_{sc}$ and a coil.

The voltage controller 640 can receive the voltage command $V_{mc}$ from the the battery management unit BMU and generate the second discharge command $I_{dc}$ or the second charge command $I_{cc}$. The voltage controller 640 can generate the second charge command $I_{cc}$ by the function of the optical coupler 650. Specifically, the voltage controller 640 can compare the voltage command $V_{mc}$ with the voltage of the battery module. The second discharge command $I_{dc}$ is generated when the voltage value of voltage command $V_{mc}$ less than the voltage value of the battery module p. The second charge command $I_{cc}$ is generated when the voltage value of voltage command $V_{mc}$ more than the voltage value of the battery module. The voltage value of voltage command $V_{mc}$ can be the average voltage value of four battery modules in the battery group.

The discharge control portion 610 can receive the second discharge command $I_{dc}$ in a peak current control mode. The battery module balance circuit MBC executes the second discharge command $I_{dc}$ and turns on the first order side switch S1, while the second order side switch S2 is still in a cutoff state.

The charge control portion 620 can receive the second discharge command $I_{cc}$ in the peak current control mode. The battery module balance circuit MBC executes the second charge command and turns on the second order side switch S2, while the first order side switch S1 is still in a cutoff state.

In FIG. 6, the battery management unit BMU generates the second discharge command $L_{dc}$ or the second discharge command $I_{cc}$ through the voltage controller 640 and the optical coupler 650, that is, the battery management unit BMU generates the second discharge command $I_{dc}$ or the second discharge command $I_{cc}$ indirectly. However, in other possible embodiment of the present disclosure (not shown), the discharge control portion 610 can receive the second discharge command $I_{dc}$ directly from the battery management unit BMU and the charge control portion 620 can also receive the second discharge command $I_{cc}$ directly from the battery management unit BMU. In that embodiment, the voltage controller 640 and the optical coupler 650 are not necessary.

Figure 7:
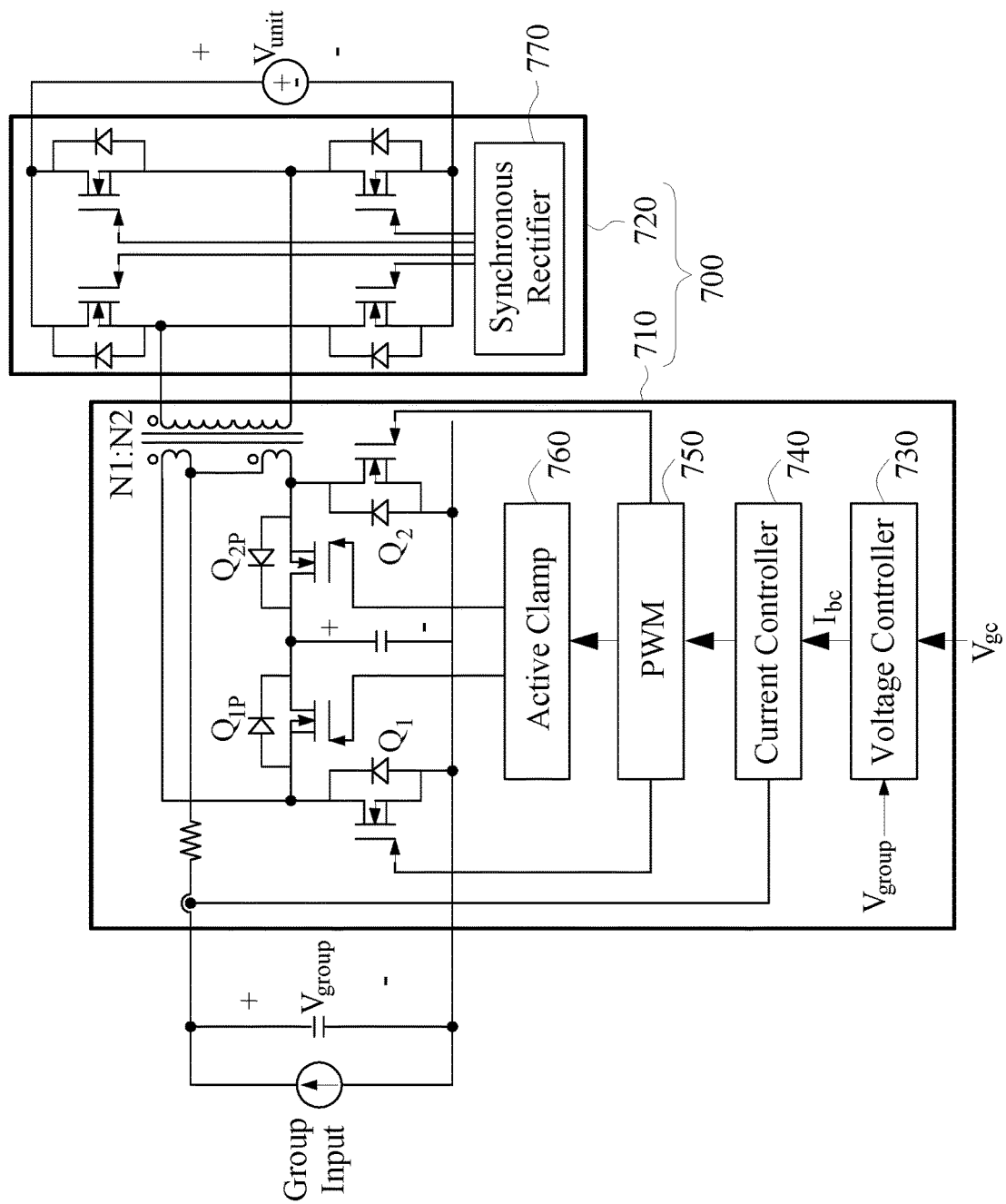
FIG. 7 is a schematic diagram of a battery group balance circuit according to an embodiment of the present disclosure.

Referring to FIG. 7, FIG. 7 is a schematic diagram of a battery group balance circuit according to an embodiment of the present disclosure. In FIG. 7, two sides of the battery group balance circuit 700 are respectively connected to the voltage of the battery group balance circuit GBC (or input ends of GBC) and the voltage of a battery unit (or input ends of battery unit) which is exemplarily connected to all of the battery group balance circuits GBC. In other possible embodiments, two sides of the battery group balance circuit 700 are respectively connected to the voltage of the battery group balance circuit GBC (or input or output ends of GBC) and the power bus of the battery system.

The battery module balance circuit 700 has an active-clamped current-fed push-pull converter 710 and a full bridge rectification 720. The active-clamped current-fed push-pull converter 710 includes a voltage controller 730, a current controller 740, a PWM 750, an active clamp 760, a first order side switch $Q_1$ and $Q_{1p}$, a second order side switch $Q_2$ and $Q_{2p}$ and a coil. The full bridge rectification 720 includes a synchronous rectifier 770 and four switches.

The voltage controller 730 can receive the voltage command $V_{gc}$ from the the battery management unit BMU and generate a positive current command $I_{bc}$ (hereinafter, the first discharge command) or a negative current command $I_{bc}$ (hereinafter, the first charge command) to the current controller 740. Specifically, the voltage controller 730 can compare the voltage command $V_{gc}$ with the voltage of the battery group. The first discharge command is generated when a voltage value of the voltage command $V_{gc}$ less than a voltage value of battery group. The first charge command is generated when the voltage value of the voltage command $V_{gc}$ more than the voltage value of battery group. The voltage value of the voltage command $V_{gc}$ can be the average voltage value of ten battery y groups.

The battery group balance circuit GBC can execute the first discharge command and turns on the first order side switch $Q_1$, while the second order side switch $Q_2$ is still in a cutoff state. The battery group balance circuit GBC can execute the first charge command and turns on the second order side switch $Q_1$, while the first order side switch $Q_2$ is still in a cutoff state.

In FIG. 7, the battery management unit BMU generates the first discharge command or the first discharge command through the voltage controller 730, the current controller 740, the PWM 750 and the active clamp 760, that is, the battery management unit BMU generates the second discharge command or the second discharge command indirectly. However, in other possible embodiment of the present disclosure (not shown), the battery group balance circuit GBC can receive the first discharge command directly from the battery management unit BMU and battery group balance circuit GBC can also receive the second discharge command directly from the battery management unit BMU.

The battery system of the present disclosure is suitable for applying to a BEV (battery electric vehicle) power system. The battery system of the present disclosure is especially suitable for an electric bus power system which requires high output voltage, for example, 600V, to drive electric bus motor. With the numbers of battery cells and the battery modules increases, the benefit of using the battery management and balance circuit and battery system of the present disclosure to improve voltage imbalance more appear.

Further, the battery system of the present disclosure can be installed in an electric bus and perform the first, second and three level voltage balances when the electric bus being charged. In this case, the first, second and three level voltage balances can be an energy aggregation and transfer process.

Figure 8:
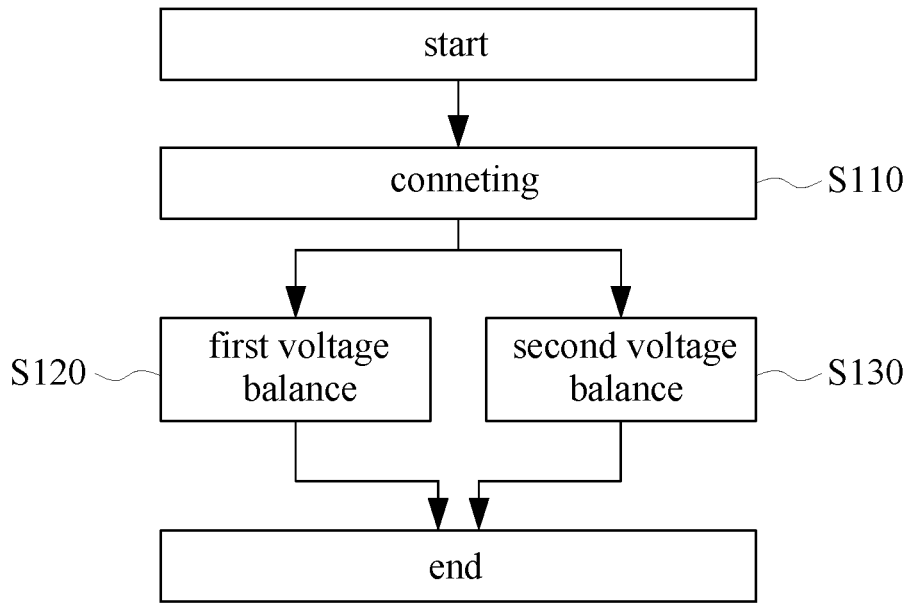
FIG. 8 is a flow chart of a battery management and balance method according to an embodiment of the present disclosure.

Referring to FIG. 8, FIG. 8 is a flow chart of a battery management and balance method according to an embodiment of the present disclosure. The battery management and balance method can be implemented in a battery system.

In FIG. 8, the battery cell management and balance method comprises a connecting step S110 of connecting a charge device to the battery system, a first voltage balance step S120 of balancing the power between the L battery groups in the charging process of the battery system and a second voltage balance step S130 of balancing the power between the M battery modules in a battery group of the L battery groups in the charging process of the battery system. The first voltage balance step S120 and the second voltage balance step S130 can be performed at the same time.

The first voltage balance step S120 can be performed by each of the L battery group balance circuits GBC. The second voltage balance step S130 can be performed by each of the M battery module balance circuits MBC in a battery group.

In the first voltage balance step S120, a first charge command can be generated and executed to charge one battery group with the lowest monitored voltage among the L battery groups and a first discharge command can be generated and executed to discharge another battery group with the highest monitored voltage among the L battery groups.

In the second voltage balance step S130, the second charge command can be generated and executed to charge one battery module with the lowest monitored voltage among the M battery modules in a battery group and the second discharge command can be generated and executed to discharge another battery module with the highest monitored voltage among the M battery modules in the battery group.

Figure 9:
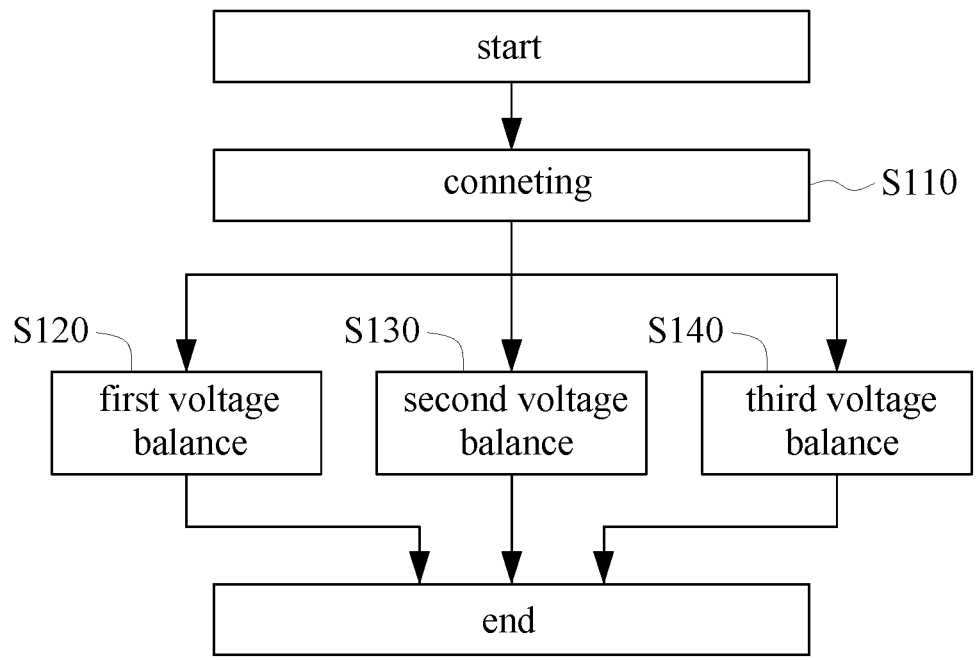
FIG. 9 is a flow chart of a battery management and balance method according to another one embodiment of the present disclosure.

Referring to FIG. 9, FIG. 9 is a flow chart of a battery management and balance method according to another one embodiment of the present disclosure. The battery cell management and balance method of this embodiment further comprises a third voltage balance step S140 of balancing the power among the N battery cells in a battery module in the charging process of the battery system.

The third voltage balance step S140 can be performed by each of the N battery group balance circuits CBC in a battery module. In the third voltage balance step S140, the third charge command can be generated and executed to charge one battery cell with the lowest monitored voltage among the N battery cells in a battery module and the third discharge command can be generated and executed to discharge another battery cell with the highest monitored voltage among the N battery cells in the battery module. The first voltage balance step S120, the second voltage balance step S130 and the third voltage balance step S140 can be performed at the same time.

The aforesaid structure, battery system and method of charging the battery system can be implemented in a battery electric vehicle and/or a charging station used to charge the battery electric vehicle. The L battery group balance circuits can be implemented in the charging station. The L×M battery module balance circuits, the battery management unit, L×M×N battery cell balance circuits and L×M battery cell monitor units can be implemented in the battery electric vehicle. In this case, the battery electric vehicle needs to be connected with the charging station for the first voltage balance (e.g. balancing the power between the L battery groups).

In conclusion, give the aforesaid structure, battery system and method of charging the battery system, the present disclosure can (but not limit to) be implemented in a high voltage BEV (battery electric vehicle) power system, features a high efficiency management and balance strategy and achieves high speed voltage balance ability.

The present disclosure is disclosed above by preferred embodiments. However, persons skilled in the art should understand that the preferred embodiments are illustrative of the present disclosure only, but should not be interpreted as restrictive of the scope of the present disclosure. Hence, all equivalent modifications and replacements made to the aforesaid embodiments should fall within the scope of the present disclosure. Accordingly, the legal protection for the present disclosure should be defined by the appended claims.

What is claimed is:

1. A battery management and balance circuit implemented in a battery system, the battery system having L battery groups connected and arranged in parallel, each of the L battery groups having M battery modules connected and arranged in series, the battery management and balance circuit comprising:
L battery group balance circuits, each of them connecting to a battery group of the L battery groups for executing a first charge or discharge command to the connected battery group;
L×M battery module balance circuits, each of them connecting to a battery group balance circuit of the L battery group balance circuits and a battery module of the L×battery modules for executing a second charge or discharge command to the connected battery module; and
a battery management unit connecting to the L battery group balance circuits, respectively, for generating the first charge or discharge commands to the L battery group balance circuits, respectively, and for generating the second charge or discharge commands to the M battery module balance circuits corresponding to the battery group to be charged or discharged;
wherein, at least one of the first charge command, the first discharge command, the second charge command, or the second discharge command are generated according to directly sensing output voltage of battery modules or battery groups without requiring battery cell information.

2. The battery management and balance circuit of claim 1, wherein each of the L×M battery modules having N battery cells connected and arranged in series and the battery management and balance circuit further comprises:
L×M×N battery cell balance circuits, each of them connecting to a battery cell of the L×M×N battery cells for executing a third charge or discharge command to the connected battery cell; and
L×M battery cell monitor units, each of them monitoring N battery cells in the same module for generating battery cell information and corresponding to the N battery cell balance circuits connected to the N battery cells, respectively, for generating the third charge or discharge commands according to battery cell information to the corresponding battery cell balance circuits.

3. The battery management and balance circuit of claim 2, wherein the battery management unit connects to L×M battery cell monitor units for receiving the battery cell information and generates the first and second charge or discharge commands according to the battery cell information.

4. The battery management and balance circuit of claim 3, wherein the battery management unit generates the first charge command to one battery group balance circuit with a lowest monitored voltage among the L corresponding battery group balance circuits and the first discharge command to another battery group balance circuit with a highest monitored voltage among the L corresponding battery group balance circuits;
wherein the battery management unit generates the second charge command to one battery module balance circuit with a lowest monitored voltage among the M corresponding battery module balance circuits and the second discharge command to another battery module balance circuit with a highest monitored voltage among the M corresponding battery module balance circuits;
wherein each of the battery cell monitor units generates the third charge command to one battery cell balance circuit with a lowest monitored voltage among the N corresponding battery cell balance circuits and the first discharge command to another battery cell balance circuit with a highest monitored voltage among the N corresponding battery cell balance circuits.

5. The battery management and balance circuit of claim 1, wherein the L battery group balance circuits are implemented in a charging station, the L×M battery module balance circuits are implemented in a battery electric vehicle and the battery management unit is also implemented in the battery electric vehicle.

6. A battery system comprising:
L battery groups connected and arranged in parallel, each of the L battery groups having M battery modules connected and arranged in series;
L battery group balance circuits, each of them connecting to a battery group of the L battery groups for executing a first charge or discharge command to the connected battery group;
L×M battery module balance circuits, each of them connecting to a battery group balance circuit of the L battery group balance circuits and a battery module of the L×battery modules for executing a second charge or discharge command to the connected battery module; and
a battery management unit connecting to the L battery group balance circuits, respectively, for generating the first charge or discharge commands to the L battery group balance circuits, respectively, and for generating the second charge or discharge commands to the M battery module balance circuits corresponding to the battery group to be charged or discharged;
wherein, at least one of the first charge command, the first discharge command, the second charge command, or the second discharge command are generated according to directly sensing output voltage of battery modules or battery groups without requiring battery cell information.

7. The battery system of claim 6, wherein each of the L×M battery modules having N battery cells connected and arranged in series and the battery system further comprises:
L×M×N battery cell balance circuits, each of them connecting to a battery cell of the L×M×N battery cells for executing a third charge or discharge command to the connected battery cell; and
L×M battery cell monitor units, each of them monitoring N battery cells in the same module for generating battery cell information and corresponding to the N battery cell balance circuits connected to the N battery cells, respectively, for generating the third charge or discharge commands according to battery cell information to the corresponding battery cell balance circuits.

8. The battery system of claim 7, wherein the battery management unit connects to L×M battery cell monitor units for receiving the battery cell information and generates the first and second charge or discharge commands according to the battery cell information.

9. The battery system of claim 8,
wherein the battery management unit generates the first charge command to one battery group balance circuit with a lowest monitored voltage among the L corresponding battery group balance circuits and the first discharge command to another battery group balance circuit with a highest monitored voltage among the L corresponding battery group balance circuits;
wherein the battery management unit generates the second charge command to one battery module balance circuit with a lowest monitored voltage among the M corresponding battery module balance circuits and the second discharge command to another battery module balance circuit with a highest monitored voltage among the M corresponding battery module balance circuits;
wherein each of the battery cell monitor units generates the third charge command to one battery cell balance circuit with a lowest monitored voltage among the N corresponding battery cell balance circuits and the first discharge command to another battery cell balance circuit with a highest monitored voltage among the N corresponding battery cell balance circuits.

10. The battery system of claim 6, wherein the L battery group balance circuits are implemented in a charging station, the L×M battery module balance circuits are implemented in a battery electric vehicle and the battery management unit is also implemented in the battery electric vehicle.

11. A battery management and balance method of charging a battery system, the battery system having L battery groups connected and arranged in parallel, each of the L battery groups having M battery modules connected and arranged in series, the battery management and balance method comprising following steps:
(a) connecting a charge device to each of the L battery groups of the battery system;
(b) balancing the power between the L battery groups in the charging process of the battery system; and
(c) balancing the power between the M battery modules in a battery group of the L battery groups in the charging process of the battery system;
wherein, at least some of the power between the L battery groups is balanced according to directly sensing output voltage of the L battery groups without requiring battery cell information;
wherein, at least some of the power between the M battery modules is balanced according to directly sensing output voltage of the M battery modules without requiring battery cell information.

12. The battery management and balance method of claim 11, wherein step (b) comprises:

(b1) generating a first charge or discharge command; and
(b2) executing the first charge or discharge command to a battery group of L battery groups.

13. The battery management and balance method of claim 12, wherein step (c) comprises:
(c1) generating a second charge or discharge command; and
(c2) executing the second charge or discharge command to a battery module of the M battery modules in the battery group.

14. The battery management and balance method of claim 13, wherein each of the L×M battery modules having N battery cells connected and arranged in series and the battery management and balance method further comprises:
(d) monitoring L×M×N battery cells for generating battery cell information;
(e) generating a third charge and discharge command according to the battery cell information; and
(f) executing the third charge and discharge command to a battery cell of the N battery cells in a battery module and thus balancing the power between the N battery cells in the battery module in the charging process of the battery system.

15. The battery management and balance method of claim 14, wherein
step (d) is performed before step (b) and step (c);
in step (b1), the generation of the first charge or discharge command is according to the battery cell information;
in step (c1), the generation of the second charge or discharge command is according to the battery cell information; and
step (b), step (c) and step (f) are performed at the same time.

16. The battery management and balance method of claim 15, wherein, in step (b2), the first charge command is executed to charge one battery group with a lowest monitored voltage among the L battery groups and the first discharge command is executed to discharge another battery group with a highest monitored voltage among the L battery groups.

17. The battery management and balance method of claim 16, wherein, in step (c2), the second charge command is executed to charge one battery module with a lowest monitored voltage among the M battery modules in a battery group and the second discharge command is executed to discharge another battery module with a highest monitored voltage among the M battery modules in the battery group.

18. The battery management and balance method of claim 17, wherein, in step (f), the third charge command is executed to charge one battery cell with a lowest monitored voltage among the N battery cells in the battery module and the third discharge command is executed to discharge another battery cell with a highest monitored voltage among the N battery cells in the battery module.

* * * * *